April 16, 1968 C. E. HILL 3,378,781

CONTROL APPARATUS

Filed Jan. 4, 1965

INVENTOR.
CHARLES E. HILL

BY Bruce C Lutz

ATTORNEY

United States Patent Office 3,378,781

Patented Apr. 16, 1968

3,378,781

CONTROL APPARATUS

Charles E. Hill, Fridley, Minn., assignor to Honeywell Inc., Minneapolis, Minn., a corporation of Delaware Filed Jan. 4, 1965, Ser. No. 423,144
6 Claims. (Cl. 330—24)

ABSTRACT OF THE DISCLOSURE

An amplifying circuit whereby the quiescent operating condition is established by a feedback circuit utilizing a filter, a Zener diode, and an amplifier.

This invention pertains to electric circuits and more specifically to amplifying circuits.

This invention provides a means and method for biasing an amplifier by providing feedback from the output to the input of the amplifier. The amount of feedback provided by the feedback circuit is indicative of the output bias level of the amplifier and the feedback signal that appears at the input of the amplifier tends to return the amplifier towards its quiescent operating condition. An amplifier constructed in accordance with this invention comprises an amplifying means having an input and an output means, and a feedback means. The feedback means includes a filter means to prevent the A-C components of the output signal from being fed back and a voltage limiting means which prevents feedback of output signals when the bias level is less than a predetermined amount.

The advantages of an amplifier constructed in accordance with this invention are that a bias condition for quiescent operation is easily obtained and bias stability is provided over considerable temperature ranges.

It is an object of this invention to provide an amplifier with a novel biasing means.

It is a further object of this invention to provide an amplifier with bias stability over temperature.

These and further objects of this invention will be evident to those skilled in the art upon a reading of this specification and appended claims in conjunction with the accompanying drawings of which:

Figure 1:
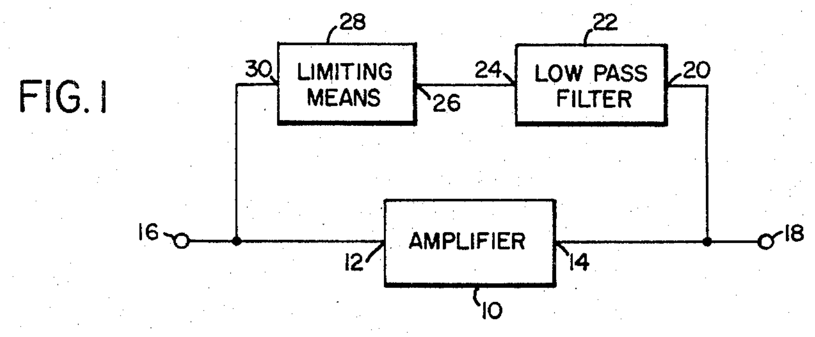
FIGURE 1 is a block diagram illustrating the invention.

In FIGURE 1 there is shown an amplifier 10 having an input 12 and an output 14. Input 12 is connected to an input terminal 16 and output 14 is connected to an output terminal 18. Output 14 of amplifier 10 is further connected to the input 20 of a low pass filter 22. An output 24 of low pass filter 22 is connected to an input 26 of a limiting means 28. An output 30 of limiting means 28 is connected to the input 12 of amplifier 10. While a low pass filter 22 has been shown, it is to be understood that any filter that will reject the A-C component of the output signal can be used. One specific example would be a band-reject filter.

Figure 2:
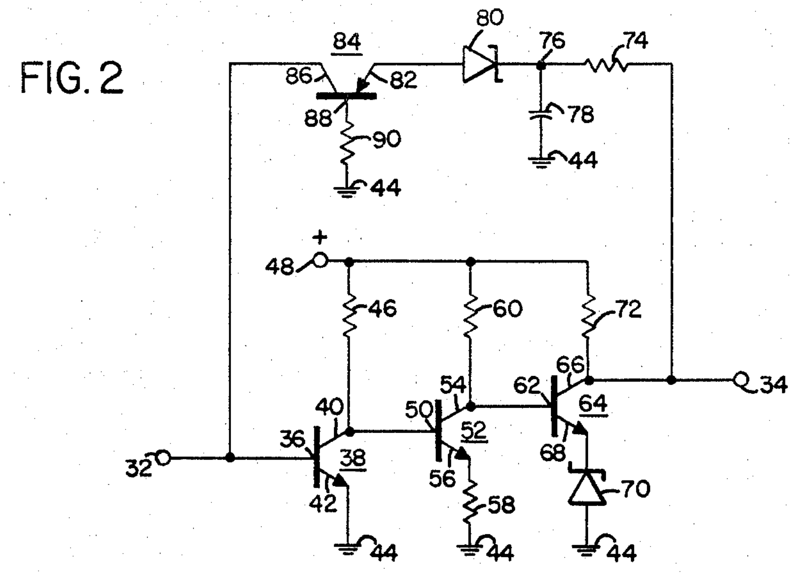
FIGURE 2 is a schematic diagram of a specific embodiment of this invention.

The operation of FIGURE 1 will be further explained in conjunction with the operation of FIGURE 2. In FIGURE 2 there is shown an input means or terminal 32 and an output means or terminal 34. Input terminal 32 is connected to a control means or base 36 of a current control means, amplifying means, or transistor means 38 which further has a collector 40 and an emitter 42. Emitter 42 is connected to a common conductor, reference potential means, or ground 44. Collector 40 of transistor 38 is connected by means of a resistor 46 to a source of bias potential 48. Collector 40 of transistor 38 is further connected to the control means or base 50 of a current control means, amplifying means, or transistor means 52 which further has a collector 54 and an emitter 56. Emitter 56 is connected by means of a resistor 58 to the common conductor 44 and collector 54 is connected by means of a resistor 60 to the source of bias potential 48. Collector 54 is further connected to the control means or base 62 of a current control means, amplifying means, or transistor means 64 which further has a collector 66 and an emitter 68. Emitter 68 is connected to the cathode of a limiting means, voltage limiting means, or Zener diode means 70. The anode of Zener diode 70 is connected to the common conductor 44. Collector 66 of transistor 64 is connected by means of a resistor 72 to the source of bias potential 48. Collector 66 of transistor 64 is further connected to the output terminal 34.

The output terminal 34 is further connected by means of a resistor 74 to a junction point 76. Junction point 76 is further connected by means of a capacitor 78 to a common conductor 44 and to the output means or cathode of a limiting means, voltage limiting means, or Zener diode 80. The anode of Zener diode 80 is connected to an input means or emitter 82 of a current control means, amplifying means, isolating means, or transistor 84. Transistor 84 further has an output means or collector 86 and a control means, common means, or base 88. Base 88 of transistor 84 is connected by means of a resistor 90 to the common conductor 44 and collector 86 is connected to the input terminal 32. The emitter-base circuit of transistor 84 can be considered an input circuit and the collector-emitter circuit can be considered an output circuit.

To understand the operation of FIGURE 2, first assume that there is no input signal applied at terminal 32. In the specific embodiment transistors 38, 52, and 64 are shown as NPN transistors, therefore, the source of bias potential 48 will be positive. The positive potential of source 48 is coupled through resistor 46 to the base 50 of transistor 52. This positive potential causes the base 50 of transistor 52 to be positive with respect to the emitter 56. Hence, transistor 52 will conduct current, the current path being from the source of positive potential 48 through resistor 60, collector 54 to emitter 56 of transistor 52, and resistor 58 to the common conductor 44. Collector 54 of transistor 52 is positive with respect to the common conductor 44 and this positive potential is coupled to the base 62 of transistor 64. This positive potential on the base 62 causes transistor 64 to conduct or to turn ON. The conduction path is from source 48 through resistor 72, collector 66 to emitter 68 of transistor 64, and Zener diode 70 to common conductor 44. It will be appreciated that the reverse breakdown voltage of Zener diode 70 must be low enough so that it will operate in its reverse breakdown region. Zener diode 70 regulates the potential of emitter 68. It will be appreciated that Zener diode 70 could be replaced by a resistor of an appropriate size.

There is also a current path from source 48 through resistor 72, resistor 74, and capacitor 78 to the common conductor 44. This current flow will cause capacitor 78 to charge thereby raising the potential of junction point 76. When the potential of junction point 76 reaches a predetermined value, determined by the reverse breakdown potential of Zener diode 80, Zener diode 80 will begin to conduct in its reverse breakdown region hence raising the potential of emitter 82 of PNP transistor 84. When the potential of emitter 82 becomes positive with respect to the base 88 of transistor 84, transistor 84 will conduct from emitter 82 to collector 86. This action will raise the potential of collector 86 and hence the potential of base 36 of transistor 38 thereby causing transistor 38 to conduct. The conduction path for transistor 38 is from the positive potential source 48 through resistor 46, collector 40 to emitter 42 of transistor 38, and to the common conductor 44.

When transistor 38 conducts or is turned ON the potential of the collector 40 will be lowered hence lowering the potential of base 50 of transistor 52 thereby decreasing the conduction of transistor 52. The decrease in conduction of transistor 52 raises the potential of collector 54 and hence base 62 of transistor 64. This rise in potential of base 62 turns transistor 64 ON further thereby lowering the potential of collector 66 and decreasing the output potential at terminal 34. This decrease in potential at output terminal 34 decreases the feedback which tends to decrease the conduction of transistor 38. By this degeneration action through the feedback loop a quiescent operating condition is established for the amplifier of FIGURE 2.

Assuming now that an input signal is applied at input terminal 32, it is seen that a positive going input signal will cause the potential of base 36 of transistor 38 to rise hence lowering the potential of collector 40 which in turn lowers the potential of base 50 decreasing the conduction of transistor 52. This decrease in conduction causes the potential of collector 54 to rise thereby raising the potential of base 62 of transistor 64. The rise in potential of base 62 causes transistor 64 to increase conduction thereby lowering the potential of collector 66. It is seen from this description that a positive going input signal at terminal 32 causes a negative going output signal at terminal 34 and that a negative going input signal will cause a positive going output signal. In other words, there is phase reversal between the input and output terminals. However, an A-C output signal at terminal 34 is coupled through resistor 74 to junction point 76 and is shorted to ground by capacitor 78. Thus, it is seen that any A-C components of the output signal are effectively filtered out by resistor 74 and capacitor 78 and are not fed back through the feedback loop.

Referring now to FIGURE 1, it is seen that amplifier 10 corresponds to transistors 38, 52, and 64 of FIGURE 2. Low pass filter 22 corresponds to resistor 74 and capacitor 78 and limiting means 28 corresponds to Zener diode 80 and transistor 84. FIGURE 1 illustrates the more general nature of the applicant's invention. While the various components of FIGURE 1 correspond to components of the specific embodiment shown in FIGURE 2, it is to be understood that that invention is not limited to the specific embodiment. Amplifier 10 can be any amplifier that exhibits phase reversing between its input and output terminals 12 and 14, respectively. However, even this phase reversal is not necessary because limiting means 28 may be designed to provide phase reversal such that a change in the quiescent operating condition of amplifier 10, which would cause a change in the bias level at output terminal 18, will provide a feedback signal at the input terminal 16 which will tend to decrease the conduction of amplifier 10.

From the above description, it will be obvious to one skilled in the art that many modifications can be made to the invention and that it is not my intention to be limited strictly by the disclosure. While specific components have been shown and specific examples used in the specific embodiment, it is to be understood that I do not wish to be limited by the specific embodiments as shown and described herein. The specific embodiment of FIGURE 2 shows a three-stage transistor amplifier which, of course, is not necessary because a five-stage amplifier substituted for the three-stage amplifier would work in essentially the same manner. Furthermore, a two-stage amplifier with the output taken from the emitter for a low impedance output is also usable. Transistor amplifier 84 could also be replaced by one that provides phase reversal in accordance with the description given in conjunction with FIGURE 1 if an amplifier 10 without phase reversal were used. I therefore desire my invention to be limited only by the scope of the following claims in which I claim:

1. An amplifying means comprising, in combination:

amplifier means having input and output means and further having first, second, and third stages of transistor amplification such that signals produced at said output means are reversed in phase with respect to signals applied at said input means;

means for supplying power connected to said amplifier means, the means for supplying power to said first stage of amplification operating to cause said second stage of amplification to conduct, and the means for supplying power to said second stage of amplification operating to cause said third stage of amplification to conduct;

feedback means including a serial connection of a low pass filter means, a Zener diode means, and a transistor means connected as a common base transistor amplifier having input and output means, said low pass filter means further including resistive means and capacitance means, said resistive means being connected to said output means of said amplifier means whereby the means for supplying power to said third stage of amplification operates to charge said capacitive means of said low pass filter means, the voltage developed on said capacitive means operates to cause said Zener diode means to conduct current, and the conduction of said Zener diode means operates to cause said common base transistor amplifier to conduct current from said input means to said output means; and means connecting said output means of said common base transistor amplifier to said input means of said amplifier means.

2. Apparatus for use in an amplifier having input and output means comprising, in combination:

low pass filter means connected to receive the output signal of said amplifier;

Zener diode means connected to said low pass filter means to receive the output signal of said low pass filter means; and amplifying means having input and output means, said input means of said amplifying means being connected to said Zener diode means and said output means being connected to said input means of said amplifier means whereby low frequency changes in the output signal of said amplifier are fed back to said input means of said amplifier to cause said amplifier to return toward its quiescent operating condition.

3. Feedback means for use in an amplifier having input and output means comprising, in combination:

filter means connected to said output means;

voltage limiting means connected to said filter means to receive the output signal of said filter means, said voltage limiting means being operable to conduct current when the output voltage of said filter means exceeds a predetermined value;

further amplifying means having input and output means;

means connecting said input means of said further amplifying means to said voltage limiting means; and means connecting said output means of said further amplifying means to said input means of said amplifier whereby a feedback signal is provided at said input means of said amplifier, said feedback signal being of a phase opposite the input signal at said input means of said amplifier.

4. Amplifying apparatus comprising, in combination:

a multiple stage amplifier means having input and output means, said amplifier means being such that output signals at said output means are of a phase opposite to the phase of input signals supplied to said input means;

means for supplying power to each stage of said amplifier means;

feedback means including a serial connection of a low pass filter means, a Zener diode means, and a transistor means connected as a common base transistor amplifier having input and output means, said low pass filter means further including resistive means and capacitance means, said resistive means being connected to said output means of said amplifier means whereby said means for supplying power operates to charge said capacitive means of said low pass filter means, the voltage developed on said capacitive means operates to cause said Zener diode means to conduct current, and the conduction of said Zener diode means operates to cause said common base transistor amplifier to conduct current from said input means to said output means of said common base transistor amplifier; and means connecting said output means of said common base transistor amplifier to said input means of said amplifier means.

5. Apparatus for use in an amplifier having input and output means comprising, in combination:

low pass filter means connected to receive the output signal of said amplifier;

voltage control means connected to said low pass filter means to receive the output signal of said low pass filter means and adapted to provide an output signal when the output voltage of said low pass filter exceeds a predetermined value; and amplifying means having an input circuit and an output circuit, said input circuit being connected to said voltage control means and said output circuit being connected to said input means of said amplifier means whereby changes in the output signal of said amplifier are fed back to said input means of said amplifier to cause said amplifier to return toward its quiescent operating condition.

6. Amplifying apparatus having input and output means comprising, in combination:

an amplifier means connected to receive input signals from said input means and further connected to said output means to supply output signals of a phase opposite to the phase of said input signals;

means for supplying power to said amplifier means;

low pass filter means including resistive means, capacitive means and having input and output means, said input means of said low pass filter means being connected to said output means of said amplifying apparatus whereby the output potential of said output means of said amplifying apparatus causes said capacitive means to charge to the potential of said output means of said amplifying apparatus;

transistor means connected as a common base transistor amplifier having input and output means;

Zener diode means connected between the output means of said low pass filter means and the input means of said transistor means, said Zener diode means establishing a controlled potential difference between the output means of said low pass filter means and the input means of said transistor means;

means connecting the output means of said transistor means to the input means of said amplifying apparatus whereby the characteristics of said Zener diode are used to stabilize the quiescent operating condition of said amplifying apparatus against variations in the characteristics of said amplifier means.

References Cited

UNITED STATES PATENTS

| | | | |
|---|---|---|---|
| 2,847,519 | 8/1958 | Aronson | 330—13 |
| 3,106,684 | 10/1963 | Luik | 330—97 X |

ROY LAKE, *Primary Examiner.*

L. J. DAHL, *Assistant Examiner.*